J. W. BRODERICK.
DEMOUNTABLE RIM FOR VEHICLE WHEELS.
APPLICATION FILED JAN. 12, 1910.
1,063,648.
Patented June 3, 1913.
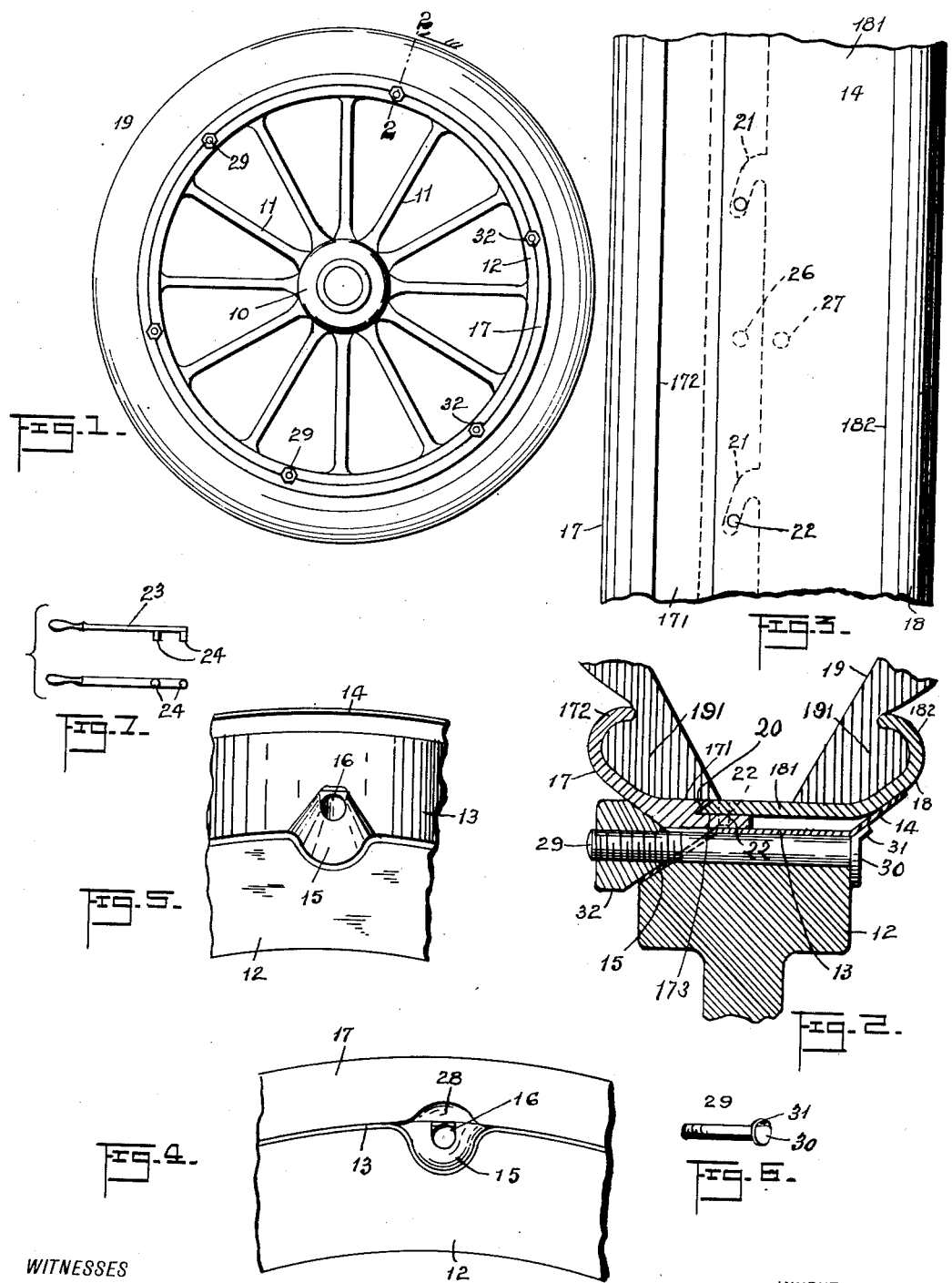
WITNESSES
Frederick Germann Jr.
Frances E. Blodgett
INVENTOR
John W. Broderick,
BY
Russell M. Everett,
ATTORNEY.

UNITED STATES PATENT OFFICE.

JOHN W. BRODERICK, OF NEWARK, NEW JERSEY.

DEMOUNTABLE RIM FOR VEHICLE-WHEELS.

1,063,648.

Specification of Letters Patent.

Patented June 3, 1913.

Application filed January 12, 1910. Serial No. 537,617.

*To all whom it may concern:*

Be it known that I, JOHN W. BRODERICK, a citizen of the United States, residing at Newark, in the county of Essex and State of New Jersey, have invented certain Improvements in Demountable Rims for Vehicle-Wheels, of which the following is a specification.

This invention relates more particularly to the attachment of a demountable rim to the body portion of a vehicle wheel, the objects of the present improvements being to secure great firmness and security of attachment; to clamp the parts together with a wedging action which shall not be limited or destroyed by wear or long continued use; to secure a positive drive from the body portion of the wheel to the rim; to secure such drive by the same means which clamp the rim to the body portion, and to obtain other advantages and results as may be brought out in the following description.

Referring to the accompanying drawings, in which like numerals of reference indicate corresponding parts in each of the several figures, Figure 1 is a side view of an automobile wheel equipped with my improved rim, looking at the outer side of the wheel; Fig. 2 is a cross section on line 2—2 of Fig. 1, the greater part of the tire being broken away; Fig. 3 is a plan of a portion of the rim, looking toward its center; Fig. 4 is a side view of a portion of the wheel body and rim thereon, the clamping or locking means being removed; Fig. 5 is a perspective view of a portion of the wheel body showing the seat which it provides for my improved rim; Fig. 6 is a detail perspective view of the clamping or locking bolt, and Fig. 7 shows in edge view and front view a wrench employed for clamping the rim sections together.

In said drawings, 10 indicates the hub of an automobile wheel, and 11, 11 the spokes of the same supporting at their outer ends a felly 12 onto which a band 13 is shrunk, or fixed in any other equivalent manner. Said band has at the inner side of the wheel, or side next the vehicle body, an outwardly inclined flange 14 which projects obliquely from the edge of that portion of the band which lies upon the felly and extends clear around the wheel, preferably. The other edge of the band 13 terminates at the edge of the felly for its greater part, although at intervals it is depressed into recesses of the felly so as to form inwardly tapering recesses 15 which terminate each in an end wall in the plane of the wheel. Through this end wall and the felly, adjacent to the band 13, extends a bolt hole 16. The demountable rim is seated upon the said band 13 and comprises sections 17 and 18, having cylindrical portions 171, 181 adapted to lie next to the band 13 and overlap upon each other, and opposite outer inwardly-curved edges 172, 182 adapted to hook over the edges 191, 191, of the tire shoe 19. As shown in the drawing, one of said sections, as 17, is recessed at its side next the tire and adjacent to its inner edge, as at 173, to receive the edge of the other or inner rim section 18, and provide an undercut stop 20 therefor. The overlapping edges of said rim sections are provided at their adjacent faces one with inclined slots 21 and the other with pins 22 adapted to enter said slots, so that by locking said slots and pins together the rim sections are clamped together with a wedging action. Preferably a wrench 23 with feet 24, 24 adapted to enter sockets 26, 27 in the two rim sections, is utilized to slide said rim sections with respect to each other when locking them together.

When the rim has the tire suitably secured to itself and is placed upon the body portion of the wheel, the inner rim section 18 rests upon the flange 14 of the band 13 and the outer rim section 17 seats directly upon the said band 13 itself. Opposite the recesses 15 above described in the band 13, the outer rim section 17 has corresponding inwardly tapering recesses 28, which, however, are preferably not so deep as the recesses 15 and do not end in a square wall, but slope to the band 13.

In order to fasten the rim upon the body portion of the wheel, bolts 29 are passed through the bolt-holes 16, said bolts each having at the inner side of the wheel a head 30 adapted to overlap upon the felly 12 and also bent obliquely outward at one edge, as at 31, to fit against the flange 14 of the band 13. The opposite end of each bolt is threaded, and adapted to receive a conical nut 32, which enters the seat formed by the recesses 15 and 28, with a powerful wedging action which clamps the rim upon the body portion of the wheel with great firmness and security. Furthermore, said nuts 32 lying in the opposite recesses 15 and 28 of the wheel body and rim serve to key said wheel body and rim together, so as to positively prevent relative slipping. The nuts 32 are angular at their outer ends for turning.

In use, the rim sections 17 and 18 are first put in place upon the tire with their edges overlapping and the pins 22 in the grooves 21. Then by means of the wrench 23 said rim sections are rotated oppositely with respect to each other, so that the edge of the inner rim section 18 is seated under the undercut shoulder or stop 20 of the outer rim section and the sections thus firmly joined so that they will not become displaced relatively to each other. The demountable rim carrying the tire is then slipped on the body portion of the wheel and the nuts 32 screwed onto the bolts 29 until their conical ends are driven into the recesses 15, 28, and the rim firmly and wedgingly bound to the wheel.

Having thus described the invention, what I claim is:

1. In a wheel, the combination of a felly having bolt holes extending transversely through itself adjacent to its periphery and conically enlarged at one end through the circumference of the felly, a band tight on said felly comprising a strip with portions at one edge of itself depressed into said conical enlargements and a flange at its other edge inclined laterally and radially outward, said strip having apertures at said depressed portions in the line of said bolt holes in the felly, bolts in said bolt holes extending through said apertures and each having at one end a head fitting against the felly and said inclined flange of the band, conical nuts on the other ends of said bolts in said depressions of the strip, and a tire rim outside said band having inclined inner lateral edges adapted to engage said conical nuts and inclined flange of the strip.

2. In a wheel, the combination of a felly portion having bolt holes extending transversely of itself adjacent to its periphery and flaringly enlarged at one end through said periphery, a band on said felly portion comprising a strip depressed at one longitudinal edge into the flaring enlargements of said bolt holes and having at the other edge a flange flaring laterally and radially outward, said strip having apertures in line with said bolt holes, clamping bolts in the bolt holes each extending through said apertures and having at one end a head beneath said flange of the strip and at the other end a tapered member in the opposite depression of the band, and a tire rim outside said band having inclined inner lateral edges adapted to engage said tapered members and flange of the strip.

3. The combination of a wheel body having a felly portion with bolt holes extending transversely therethrough and flaringly enlarged at one end through the periphery of the felly portion, a band on said felly portion comprising a strip depressed at one edge into the flaring enlargements of said bolt holes and having at the other edge a flange flaring laterally and radially outward, and clamping bolts in said bolt holes each extending through the said strip and having on opposite sides thereof a head beneath the flange of the strip and a tapered member lying in a depression of the strip and flaring outward oppositely to said flange.

JOHN W. BRODERICK.

In the presence of—
RUSSELL M. EVERETT,
FRANCES E. BLODGETT.